United States Patent
Chen et al.

(10) Patent No.: US 11,310,814 B2
(45) Date of Patent: Apr. 19, 2022

(54) WIRELESS COMMUNICATION METHOD, NETWORK DEVICE, AND TERMINAL DEVICE

(71) Applicant: GUANGDONG OPPO MOBILE TELECOMMUNICATIONS CORP., LTD., Guangdong (CN)

(72) Inventors: Wenhong Chen, Guangdong (CN); Zhi Zhang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/812,134

(22) Filed: Mar. 6, 2020

(65) Prior Publication Data
US 2020/0214025 A1   Jul. 2, 2020

Related U.S. Application Data

(63) Continuation of application No. PCT/CN2017/101134, filed on Sep. 8, 2017.

(51) Int. Cl.
*H04W 72/12* (2009.01)
*H04W 72/04* (2009.01)
(Continued)

(52) U.S. Cl.
CPC ....... *H04W 72/1268* (2013.01); *H04L 5/0051* (2013.01); *H04L 25/0226* (2013.01);
(Continued)

(58) Field of Classification Search
CPC .......... H04W 72/1268; H04W 72/042; H04W 72/0453; H04W 72/04; H04W 25/0226;
(Continued)

(56) References Cited

U.S. PATENT DOCUMENTS 10,455,635 B2 * 10/2019 Park ..................... H04W 76/15
2009/0163208 A1   6/2009 Rao
(Continued)

FOREIGN PATENT DOCUMENTS

CN    101904199 A    12/2010
CN    102150466 A    8/2011
(Continued)

OTHER PUBLICATIONS

Guangdong OPPO Mobile Telecommunications Corp. Ltd., Official Action, RU2020113010, dated Jan. 21, 2021, 13 pgs.
(Continued)

*Primary Examiner* — Candal Elpenord
(74) *Attorney, Agent, or Firm* — Morgan, Lewis & Bockius LLP (57) ABSTRACT

Embodiments of this application provide a wireless communication method and a device, to improve communication performance in terms of frequency band deployment, use, and processing. The method includes: determining, by a network device, a first uplink carrier, where the first uplink carrier is one of a plurality of uplink carriers that can be used for a terminal device; and sending, by the network device, first information to the terminal device, where the first information indicates that the terminal device uses or can use the first uplink carrier to perform uplink transmission or processes the first uplink carrier.

30 Claims, 5 Drawing Sheets

(51) Int. Cl.
  *H04W 80/08* (2009.01)
  *H04L 25/02* (2006.01)
  *H04L 5/00* (2006.01)
(52) U.S. Cl.
  CPC ..... *H04W 72/042* (2013.01); *H04W 72/0453* (2013.01); *H04W 80/08* (2013.01)
(58) Field of Classification Search
  CPC ... H04W 80/08; H04L 5/0051; H04L 25/0226
  See application file for complete search history.

(56) References Cited

U.S. PATENT DOCUMENTS

| | | | |
|---|---|---|---|
| 2010/0067470 A1 | 3/2010 | Damnjanovic et al. | |
| 2010/0130137 A1 | 5/2010 | Pelletier et al. | |
| 2011/0250918 A1 | 10/2011 | Jen | |
| 2012/0208583 A1 | 8/2012 | Chung et al. | |
| 2012/0275393 A1* | 11/2012 | Sorrentino | H04L 5/0048 370/329 |
| 2013/0010619 A1* | 1/2013 | Fong | H04W 72/0453 370/252 |
| 2013/0094409 A1 | 4/2013 | Li et al. | |
| 2013/0336260 A1 | 12/2013 | Damnjanovic et al. | |
| 2014/0086167 A1 | 3/2014 | Seo et al. | |
| 2016/0119930 A1* | 4/2016 | Yan | H04W 74/006 370/329 |
| 2017/0302419 A1* | 10/2017 | Liu | H04L 5/0082 |
| 2017/0332370 A1* | 11/2017 | Rico Alvarino | H04W 72/0413 |

FOREIGN PATENT DOCUMENTS

| | | |
|---|---|---|
| CN | 102293046 A | 12/2011 |
| CN | 105491624 A | 4/2016 |
| JP | 2011508515 A | 3/2011 |
| RU | 2010129110 A | 1/2012 |
| WO | WO2012/095180 A1 | 7/2012 |

OTHER PUBLICATIONS

Huawei, HiSilicon, Initial access and uplink operations with SUL, 3GPP TSG RAN WG1 Meeting #90, R1-1712165, Prague, Czech Republic, Aug. 21-25, 2017, 6 pgs.
Huawei, HiSilicon, UL power control for SUL and LTE-NR uplink coexistence with UL sharing, 3GPP TSG RAN WG1 Meeting #90, R1-1712164, Prague, Czech Republic, Aug. 21-25, 2017, 5 pgs.
Guangdong OPPO Mobile Telecommunications Corp. Ltd., Supplementary International Search Report, PCT/CN2017/101134, dated Jan. 21, 2020, 19 pgs.
Huawei, HiSilicon, Single UL transmission in NSA and SA NR, 3GPP TSG-RAN WG2 Meeting #99 R2-1709609, Berlin, Germany, Aug. 21-25, 2017, 4 pgs.
Lte Advanced Pro, 3GPP TS 36.321 V14.3.0 (Jun. 2017), Technical Specification 3rd Generation Partnership Project; Technical Specification Group Radio Access Network; Evolved Universal Terrestrial Radio Access (E-UTRA);Medium Access Control (MAC) protocol specification (Release 14), 107 pgs.
Lte Advanced Pro, 3GPP TS 36.300 V14.3.0 (Jun. 2017) Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), 331 pgs.
Lte Advanced Pro, 3GPP TS 36.331 V14.3.0 (Jun. 2017) Technical Specification 3rd Generation Partnership Project; Technical Specification Group Radio Access Network; Evolved Universal Terrestrial Radio Access (E-UTRA); Radio Resource Control (RRC); Protocol specification (Release 14), 745 pgs.
Ltd Avanced Pro, 3GPP TS 36.212 V14.3.0 (Jun. 2017) Technical Specification 3rd Generation Partnership Project; Technical Specification Group Radio Access Network; Evolved Universal Terrestrial Radio Access (E-UTRA); Multiplexing and channel coding (Release 14), 198 pgs.
Guangdong OPPO Mobile Telecommunications Corp. Ltd., Extended European Search Report, EP17924632.7, dated Aug. 18, 2020, 13 pgs.
Qualcomm Incorporated, NR-LTE Co-channel Coexistence Considerations, 3GPP TSG-RAN WG1 NR#2, R1-1711229, Jun. 27-30, 2017, Qingdao, P.R. China, 5 pgs.
Samsung, LTE-NR Coexistence for UL, 3GPP TSG RAN WG1 NR Ad-Hoc #2, R1-1710763, Qingdao, P.R. China Jun. 27-30, 2017, 8 pgs.
International Search Report and Written Opinion, PCT/CN2017/101134, dated Mar. 29, 2018, 16 pgs.
Guangdong OPPO Mobile Telecommunications Corp. Ltd., Communication Pursuant to Article 94(3), EP17924632.7, dated Aug. 17, 2021, 8 pgs.
Guangdong OPPO Mobile Telecommunications Corp. Ltd., Invitation to Respond to Written Opinion, Singapore Application No. 11202002128P, dated Sep. 10, 2021, 10 pgs.
Guangdong OPPO Mobile Telecommunications Corp. Ltd., First Office Action, CN202010263568.8, dated Jul. 26, 2021, 21 pgs.
Notice of Reasons for Refusal, JP2020-513780, dated Jul. 20, 2021, 10 pgs.
Samsung, On supporting the supplementary uplink frequency, 3GPP TSG-RAN WG2 Meeting #99, R2-1708895, Berlin, Germany, Aug. 21-25, 2017, 2 pgs.
CATT, Support of UL carrier sharing between NR-LTE, 3GPP TSG RAN WG1 NR Ad Hoc#2, R1-1710041, Qingdao, China Jun. 27-30, 2017, 4 pgs.
CMCC, Discussion on SUL and UL sharing band definition, 3GPP TSG-RAN WG4 Meeting NR#2, R4-1706706, Qingdao, China, May 27-29, 2017, 6 pgs.
3GPP TR 38.802 V14.1.0, Jun. 2017, 3rd Generation Partnership Project, Technical Specification Group Radio Access Network, Study on New Radio Access Technology, Physical Layer Aspects, (Release 14), 144 pgs.
Guangdong OPPO Mobile Telecommunmications Corp. Ltd., Examination Report, IN202017015173, dated Jul. 1, 2021, 7 pgs.
Guangdong OPPO Mobile Telecommunmications Corp. Ltd., Communication Pursuant to Article 94(3), EP17924632.7, dated May 31, 2021, 11 pgs.
Guangdong OPPO Mobile Telecommunmications Corp. Ltd., Requisition by the Examiner, CA3075186, dated Apr. 22, 2021, 3 pgs.
China Unicom, On NR-LTE coexistence for NSA and SA, 3GPP TSG RAN WG1 NR Ad-Hoc#2, R1-1711337, Qingdao, P.R. China Jun. 27-30, 2017, 5 pgs.
Guangdong OPPO Mobile Telecommunications Corp. Ltd., Second Office Action, CN202010263568.8, dated Oct. 27, 2021, 19 pgs.
Guangdong OPPO Mobile Telecommunications Corp. Ltd., Notification of Reason for Refusal, KR1020207009060, dated Oct. 21, 2021, 11 pgs.
Guangdong OPPO Mobile Telecommunications Corp. Ltd., First Office Action, TW107131635, dated Sep. 12, 2021, 16 pgs.
Guangdong OPPO Mobile Telecommunications Corp. Ltd., First Office Action, TW107131635, dated Sep. 30, 2021, 16 pgs.
CMCC, "Considerations on support of supplementary uplink frequency," 3GPP TSG-RAN WG2 Meeting #99, R2-1709093, Berlin, Germany, Aug. 21-25, 2017, 4 pgs.
3GPP TS 36.213 v14.3.0 (Jun. 2017), 3rd Generation Partnership Project, Technical Specification Group Radio Access Network, Evolved Universal Terrestrial Radio Access (E-UTRA), Physical layer procedures (Release 14), 263 pgs.
3GPP TS 36.101 V14.4.0 (Jun. 2017), 3rd Generation Partnership Project, Technical Specification Group Radio Access Network, Evolved Universal Terrestrial Radio Access (E-UTRA), User Equipment (UE) radio transmission and reception, (Release 14), 441 pgs.
Guangdong OPPO Mobile Telecommunications Corp. Ltd., Communication Pursuant to Article 94(3), EP17924632.7, dated Dec. 23, 2021, 11 pgs.

* cited by examiner

WIRELESS COMMUNICATION METHOD, NETWORK DEVICE, AND TERMINAL DEVICE

CROSS-REFERENCE TO RELATED APPLICATIONS

This application is a continuation application of PCT Patent Application No. PCT/CN2017/101134, entitled "WIRELESS COMMUNICATION METHOD, NETWORK DEVICE AND TERMINAL DEVICE" filed on Sep. 8, 2017, which is incorporated by reference in its entirety.

TECHNICAL FIELD

This application relates to the communications field, and more specifically, to a wireless communication method, a network device, and a terminal device.

RELATED ART

In a Long Term Evolution (Long Term Evolution, LTE) system, there are a fixed uplink carrier and a fixed downlink carrier. A terminal device and a network may perform uplink and downlink communication by using the fixed uplink carrier and downlink carrier respectively.

A future communications system requires relatively high communication performance.

Therefore, how to improve communication performance in terms of frequency band deployment, use, and processing is a problem that needs to be resolved urgently.

SUMMARY

Embodiments of this application provide a wireless communication method and a device, to improve communication performance in terms of frequency band deployment, use, and processing.

A first aspect provides a wireless communication method, including:

determining, by a network device, a first uplink carrier, where the first uplink carrier is one of a plurality of uplink carriers that can be used for a terminal device; and sending, by the network device, first information to the terminal device, where the first information indicates that the terminal device uses or can use the first uplink carrier to perform uplink transmission or processes the first uplink carrier.

Therefore, in the embodiments of this application, the plurality of uplink carriers may be used for uplink transmission of the terminal device, and the network device may provide an indication as to use or processing of one of the plurality of uplink carriers, so that uplink transmission of the terminal device can be more flexible, thereby improving communication performance.

With reference to the first aspect, in a possible implementation of the first aspect, the sending, by the network device, first information to the terminal device includes:

sending, by the network device, the first information to a plurality of terminal devices by using broadcast signaling, remaining minimum system information RMSI, or system information.

With reference to the first aspect or any possible implementation described above, in another possible implementation of the first aspect, the sending, by the network device, first information to the terminal device includes:

sending, by the network device, the first information to a single terminal device by using high layer signaling.

With reference to the first aspect or any possible implementation described above, in another possible implementation of the first aspect, the first information indicates that the terminal device uses the first uplink carrier to perform uplink transmission; and the method further includes:

sending, by the network device, second information to the terminal device, where the second information is used to activate or configure the first uplink carrier for the terminal device.

With reference to the first aspect or any possible implementation described above, in another possible implementation of the first aspect, the first information is carried in downlink control information DCI.

With reference to the first aspect or any possible implementation described above, in another possible implementation of the first aspect, the method further includes:

determining, by the network device, a second uplink carrier in the plurality of uplink carriers that can be used for the terminal device; and sending, by the network device, third information to the terminal device, where the third information indicates that the terminal device uses the second uplink carrier to perform uplink transmission, where the first information and the third information are sent respectively in different scheduling processes of performing scheduling for the terminal device after the first uplink carrier is activated or configured.

With reference to the first aspect or any possible implementation described above, in another possible implementation of the first aspect, the first information indicates that the terminal device uses the first uplink carrier to perform uplink transmission; and the method further includes:

determining, by the network device, a third uplink carrier, where the third uplink carrier is a link carrier other than the first uplink carrier of the plurality of uplink carriers; and sending, by the network device, fourth information to the terminal device, where the fourth information indicates that the terminal device uses the third uplink carrier to perform uplink transmission, so that the terminal device stops using the first uplink carrier, and uses the third uplink carrier instead to perform uplink transmission.

With reference to the first aspect or any possible implementation described above, in another possible implementation of the first aspect, the uplink transmission is physical uplink control channel PUCCH transmission or physical uplink shared channel PUSCH transmission.

With reference to the first aspect or any possible implementation described above, in another possible implementation of the first aspect, the first information is carried in information about a sounding reference signal SRS; and the first information indicates that the terminal device uses the first uplink carrier to transmit the SRS.

With reference to the first aspect or any possible implementation described above, in another possible implementation of the first aspect, the first information is carried in SRS configuration information for semi-statically configuring the SRS; or the first information is carried in a trigger message for dynamically triggering the SRS.

With reference to the first aspect or any possible implementation described above, in another possible implementation of the first aspect, the first information is carried in configuration information used for a random access process; and the first information indicates that the terminal device uses or can use the first uplink carrier to perform a random access process.

With reference to the first aspect or any possible implementation described above, in another possible implementation of the first aspect, the configuration information indicates a frequency domain position of a random access resource relative to a reference carrier position.

With reference to the first aspect or any possible implementation described above, in another possible implementation of the first aspect, the reference carrier position is a carrier position of the first uplink carrier; or the reference carrier position is a carrier position of an uplink carrier other than the first uplink carrier of the plurality of uplink carriers; or the reference carrier position is a carrier position of a downlink carrier of the terminal device.

With reference to the first aspect or any possible implementation described above, in another possible implementation of the first aspect, configuration signaling to which the configuration information belongs is further used to indicate a random access resource and/or a random access code for a random access process on at least one second uplink carrier.

With reference to the first aspect or any possible implementation described above, in another possible implementation of the first aspect, the method further includes:

sending, by the network device, indication information to the terminal device, where the indication information indicates a parameter used to select an uplink carrier during random access.

With reference to the first aspect or any possible implementation described above, in another possible implementation of the first aspect, the parameter is used for the terminal device to determine a downlink DL signal threshold corresponding to an uplink carrier, so that the terminal device selects a corresponding uplink carrier for a random access process based on a relationship between a DL signal measurement result and the DL signal threshold.

With reference to the first aspect or any possible implementation described above, in another possible implementation of the first aspect, the indication information is carried in the configuration signaling to which the configuration information belongs; or the indication information is sent by using broadcast signaling, RMSI, or system information.

With reference to the first aspect or any possible implementation described above, in another possible implementation of the first aspect, the random access process is a contention-free random access process.

With reference to the first aspect or any possible implementation described above, in another possible implementation of the first aspect, the first information is carried in a command used for adjusting timing or is carried in transmission of a command used for adjusting timing, and the first information is used to indicate adjustment of timing for the first uplink carrier.

With reference to the first aspect or any possible implementation described above, in another possible implementation of the first aspect, the first information is carried in a field included in the command used for adjusting timing; or the first information is indicated by processing information of a physical layer channel used to carry the command used for adjusting timing.

With reference to the first aspect or any possible implementation described above, in another possible implementation of the first aspect, the first information is carried in power adjustment information for the terminal device or is carried in transmission of power adjustment information, and the first information is used to indicate power adjustment for the first uplink carrier.

With reference to the first aspect or any possible implementation described above, in another possible implementation of the first aspect, the plurality of uplink carriers that can be used for the terminal device respectively belong to a plurality of different frequency bands.

With reference to the first aspect or any possible implementation described above, in another possible implementation of the first aspect, a frequency band to which the first uplink carrier belongs is lower than frequency bands to which other uplink carriers belong.

A second aspect provides a wireless communication method, including:

receiving, by a network device, a power headroom report reported by a terminal device for a plurality of uplink carriers that can be used for the terminal device.

Therefore, in the embodiments of this application, the terminal device determines the power headroom report based on the plurality of uplink carriers that can be used for the terminal device, and sends the power headroom report to the network device, so that the network device may use the power headroom report to schedule, for the terminal device, the plurality of uplink carriers that can be used for the terminal device.

With reference to the second aspect, in a possible implementation of the second aspect, the power headroom report includes a power headroom report independently reported by the terminal device for each of the plurality of uplink carriers.

With reference to the second aspect or any possible implementation described above, in another possible implementation of the second aspect, the power headroom report includes a power headroom report reported by the terminal device by using the plurality of uplink carriers as a whole.

With reference to the second aspect or any possible implementation described above, in another possible implementation of the second aspect, the plurality of uplink carriers that can be used for the terminal device respectively belong to a plurality of different frequency bands.

A third aspect provides a wireless communication method, including:

receiving, by a terminal device, first information sent by a network device, where the first information indicates that the terminal device uses or can use a first uplink carrier to perform uplink transmission or processes a first uplink carrier, and the first uplink carrier is one of a plurality of uplink carriers that can be used for the terminal device; and based on the first information, using or selecting to use the first uplink carrier to perform uplink transmission or processing the first uplink carrier.

With reference to the third aspect, in a possible implementation of the third aspect, the receiving, by a terminal device, first information sent by a network device includes:

receiving, by the terminal device, the first information sent by the network device by using broadcast signaling, remaining minimum system information RMSI, or system information.

With reference to the third aspect or any possible implementation described above, in another possible implementation of the third aspect, the receiving, by a terminal device, first information sent by a network device includes:

receiving, by the terminal device, the first information sent by the network device by using high layer signaling.

With reference to the third aspect or any possible implementation described above, in another possible implementation of the third aspect, the first information indicates that the terminal device uses the first uplink carrier to perform uplink transmission; and the method further includes:

receiving, by the terminal device, second information sent by the network device, where the second information is used to activate or configure the first uplink carrier for the terminal device; and activating or configuring, by the terminal device, the first uplink carrier.

With reference to the third aspect or any possible implementation described above, in another possible implementation of the third aspect, the first information is carried in downlink control information DCI.

With reference to the third aspect or any possible implementation described above, in another possible implementation of the third aspect, the method further includes:

receiving, by the terminal device, third information sent by the network device, where the third information indicates that the terminal device uses a second uplink carrier to perform uplink transmission, and the second uplink carrier is a link carrier other than the first uplink carrier of the plurality of uplink carriers; and using, by the network device based on the third information, the second uplink carrier to perform uplink transmission, where the first information and the third information are transmitted respectively in different scheduling processes of performing scheduling for the terminal device after the first uplink carrier is activated or configured.

With reference to the third aspect or any possible implementation described above, in another possible implementation of the third aspect, the first information indicates that the terminal device uses the first uplink carrier to perform uplink transmission; and the method further includes:

receiving, by the terminal device, fourth information sent by the network device, where the fourth information indicates that the terminal device uses a third uplink carrier to perform uplink transmission, and the third uplink carrier is a link carrier other than the first uplink carrier of the plurality of uplink carriers; and stopping, by the terminal device, using the first uplink carrier, and using the third uplink carrier instead to perform uplink transmission.

With reference to the third aspect or any possible implementation described above, in another possible implementation of the third aspect, the uplink transmission is PUCCH transmission or PUSCH transmission.

With reference to the third aspect or any possible implementation described above, in another possible implementation of the third aspect, the first information is carried in information about a sounding reference signal SRS; and the first information indicates that the terminal device uses the first uplink carrier to transmit the SRS.

With reference to the third aspect or any possible implementation described above, in another possible implementation of the third aspect, the first information is carried in SRS configuration information for semi-statically configuring the SRS; or the first information is carried in a trigger message for dynamically triggering the SRS.

With reference to the third aspect or any possible implementation described above, in another possible implementation of the third aspect, the first information is carried in configuration information used for a random access process; and the first information indicates that the terminal device uses or can use the first uplink carrier to perform a random access process.

With reference to the third aspect or any possible implementation described above, in another possible implementation of the third aspect, the configuration information indicates a frequency domain position of a random access resource relative to a reference carrier position.

With reference to the third aspect or any possible implementation described above, in another possible implementation of the third aspect, the reference carrier position is a carrier position of the first uplink carrier; or the reference carrier position is a carrier position of an uplink carrier other than the first uplink carrier of the plurality of uplink carriers; or the reference carrier position is a carrier position of a downlink carrier of the terminal device.

With reference to the third aspect or any possible implementation described above, in another possible implementation of the third aspect, configuration signaling to which the configuration information belongs is further used to indicate a random access resource and/or a random access code for a random access process on at least one second uplink carrier.

With reference to the third aspect or any possible implementation described above, in another possible implementation of the third aspect, the method further includes:

receiving, by the terminal device, indication information sent by the network device, where the indication information indicates a parameter used to select an uplink carrier during random access.

With reference to the third aspect or any possible implementation described above, in another possible implementation of the third aspect, the parameter is used for the terminal device to determine a DL signal threshold corresponding to an uplink carrier, where a corresponding uplink carrier is selected for a random access process based on a relationship between a DL signal measurement result and the DL signal threshold.

With reference to the third aspect or any possible implementation described above, in another possible implementation of the third aspect, the indication information is carried in the configuration signaling to which the configuration information belongs; or the indication information is sent by using broadcast signaling, RMSI, or system information.

With reference to the third aspect or any possible implementation described above, in another possible implementation of the third aspect, the random access process is a contention-free random access process.

With reference to the third aspect or any possible implementation described above, in another possible implementation of the third aspect, the first information is carried in a command used for adjusting timing or is carried in transmission of a command used for adjusting timing, and the first information is used to indicate adjustment of timing for the first uplink carrier.

With reference to the third aspect or any possible implementation described above, in another possible implementation of the third aspect, the first information is carried in a field included in the command used for adjusting timing; or the first information is indicated by processing information of a physical layer channel used to carry the command used for adjusting timing.

With reference to the third aspect or any possible implementation described above, in another possible implementation of the third aspect, the first information is carried in power adjustment information for the terminal device or is carried in transmission of power adjustment information, and the first information is used to indicate power adjustment for the first uplink carrier.

With reference to the third aspect or any possible implementation described above, in another possible implementation of the third aspect, the plurality of uplink carriers that can be used for the terminal device respectively belong to a plurality of different frequency bands.

With reference to the third aspect or any possible implementation described above, in another possible implementation of the third aspect, a frequency band to which the first uplink carrier belongs is lower than frequency bands to which other uplink carriers belong.

A fourth aspect provides a wireless communication method, including:

determining, by a terminal device, a power headroom report based on a plurality of uplink carriers that can be used for the terminal device; and sending, by the terminal device, the power headroom report to a network device.

With reference to the fourth aspect, in a possible implementation of the fourth aspect, the power headroom report includes a power headroom report determined independently by the terminal device for each of the plurality of uplink carriers.

With reference to the fourth aspect or any possible implementation described above, in another possible implementation of the fourth aspect, the power headroom report includes a power headroom report acquired by the terminal device by using the plurality of uplink carriers as a whole.

With reference to the fourth aspect or any possible implementation described above, in another possible implementation of the fourth aspect, the plurality of uplink carriers that can be used for the terminal device respectively belong to a plurality of different frequency bands.

A fifth aspect provides a network device, configured to perform the foregoing method in the first aspect or any possible implementation of the first aspect or the second aspect or any possible implementation of the second aspect. Specifically, the network device includes functional modules configured to perform the foregoing method in the first aspect or any possible implementation of the first aspect or the second aspect or any possible implementation of the second aspect.

A sixth aspect provides a terminal device, configured to perform the foregoing method in the third aspect or any possible implementation of the third aspect or the fourth aspect or any possible implementation of the fourth aspect. Specifically, the terminal device includes functional modules configured to perform the foregoing method in the third aspect or any possible implementation of the third aspect or the fourth aspect or any possible implementation of the fourth aspect.

A seventh aspect provides a network device, including a processor, a memory, and a transceiver. The processor, the memory, and the transceiver communicate with each other through internal connection channels to transfer control and/or data signals, to enable the network device to perform the foregoing method in the first aspect or any possible implementation of the first aspect or the second aspect or any possible implementation of the second aspect.

An eighth aspect provides a terminal device, including a processor, a memory, and a transceiver. The processor, the memory, and the transceiver communicate with each other through internal connection channels to transfer control and/or data signals, to enable the terminal device to perform the foregoing method in the third aspect or any possible implementation of the third aspect or the fourth aspect or any possible implementation of the fourth aspect.

A ninth aspect provides a computer readable medium, configured to store a computer program, the computer program including an instruction used to perform any method in the foregoing or any possible implementation.

A tenth aspect provides a computer program product including an instruction, where the instruction enables, when being executed on a computer, the computer to perform any method in the foregoing or the method in any possible implementation.

BRIEF DESCRIPTION OF THE DRAWINGS

To describe the technical solutions in the embodiments of this application more clearly, the following briefly describes the accompanying drawings required for describing the embodiments or the prior art. Apparently, the accompanying drawings in the following description show merely some embodiments of this application, and a person of ordinary skill in the art may still derive other drawings from these accompanying drawings without creative efforts.

DETAILED DESCRIPTION

The technical solutions in the embodiments of this application are described with reference to the accompanying drawings in the embodiments of this application below. Apparently, the described embodiments are some but not all of the embodiments of this application. All other embodiments obtained by a person of ordinary skill in the art based on the embodiments of this application without creative efforts shall fall within the protection scope of this application.

The technical solutions according to the embodiments of this application may be applied to a variety of communications systems, such as a Global System for Mobile communication (Global System for Mobile communications, "GSM" for short) system, a Code Division Multiple Access (Code Division Multiple Access, "CDMA" for short) system, a Wideband Code Division Multiple Access (Wideband Code Division Multiple Access, "WCDMA" for short) system, a General Packet Radio Service (General Packet Radio Service, "GPRS" for short), a Long Term Evolution (Long Term Evolution, "LTE" for short) system, an LTE Frequency Division Duplex (Frequency Division Duplex, "FDD" for short) system, an LTE Time Division Duplex (Time Division Duplex, "TDD" for short), a Universal Mobile Telecommunications system (Universal Mobile Telecommunications system, "UMTS" for short), a Worldwide Interoperability for Microwave Access (Worldwide Interoperability for Microwave Access, "WiMAX" for short) communications system, a future 5G system (which may also be referred to as a New Radio (New Radio, NR) system), or the like.

It should be understood that terms "system" and "network" in this specification are usually interchangeably used in this specification. The term "and/or" in this specification is only an association relationship for describing the associated objects, and represents that three relationships may exist. For example, A and/or B may represent the following three cases: only A exists, both A and B exist, and only B exists. In addition, the character "/" in this specification generally indicates an "or" relationship between the associated objects.

Figure 1:
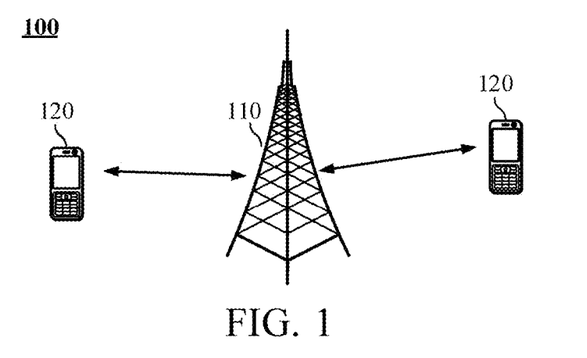
FIG. 1 is a schematic diagram of a wireless communications system according to an embodiment of this application.

FIG. 1 shows a wireless communications system 100 according to an embodiment of this application.

It should be understood that FIG. 1 exemplarily shows one network device and two terminal devices. Optionally, the wireless communications system 100 may include a plurality of network devices and another quantity of terminal devices may be included in a coverage area of each network device. This is not limited in this embodiment of this application.

Optionally, the wireless communications system 100 may further include another network entity such as a network controller or a mobility management entity. This is not limited in this embodiment of this application.

As shown in FIG. 1, the wireless communications system 100 may include a network device 110. The network device 100 may be a device communicating with a terminal device. The network device 100 may provide communication coverage for a specific geographic area, and may communicate with a terminal device (for example, UE) located within the coverage area. Optionally, the network device 100 may be a base transceiver station (Base Transceiver Station, BTS) in a GSM system or a CDMA system, may be a NodeB (NodeB, NB) in a WCDMA system, or may be an evolved Node B (Evolutional Node B, eNB or eNodeB) in an LTE system or a wireless controller in a cloud radio access network (Cloud Radio Access Network, CRAN), or the network device may be a relay station, an access point, an in-vehicle device, a wearable device, a network-side device in a future 5G network, a network device in a future evolved public land mobile network (Public Land Mobile Network, PLMN), or the like.

The wireless communications system 100 further includes at least one terminal device 120 located within a coverage area of the network device 110. The terminal device 120 may be mobile or fixed. Optionally, the terminal device 120 may be an access terminal, user equipment (User Equipment, UE), a user unit, a user station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device having a wireless communication function, a computing device or another processing device connected to a wireless modem, an in-vehicle device, a wearable device, a terminal device in a future 5G network, a terminal device in a future evolved PLMN, or the like.

Optionally, the terminal device 120 may perform terminal-to-terminal direct (Device to Device, D2D) communication.

Optionally, a 5G system or network may also be referred to as a new radio (New Radio, NR) system or network.

A high frequency band is an important alternative frequency band for deploying a 5G (NR) network. Because a frequency band is relatively high, a coverage area is relatively limited (as compared with low frequency LTE). In a downlink (Downlink, DL), because a base station has a relatively high transmit power, large-scale multiple input multiple output (Multiple Input Multiple Output, MIMO) (hybrid Beamforming) or the like improves DL coverage. Because UE has a limited transmit power, UL coverage will become a bottleneck.

Therefore, one uplink (Uplink. UL) carrier may be deployed at a low frequency and used to perform NR transmission. The UL carrier may be referred to as a supplementary uplink (Supplementary Uplink, SUL) carrier. In this case, NR has at least two UL carriers. To be specific, one UL carrier is an SUL carrier, and the other UL carrier is a high frequency UL carrier (which is referred to as an NR dedicated (dedicated) UL).

Figure 2:
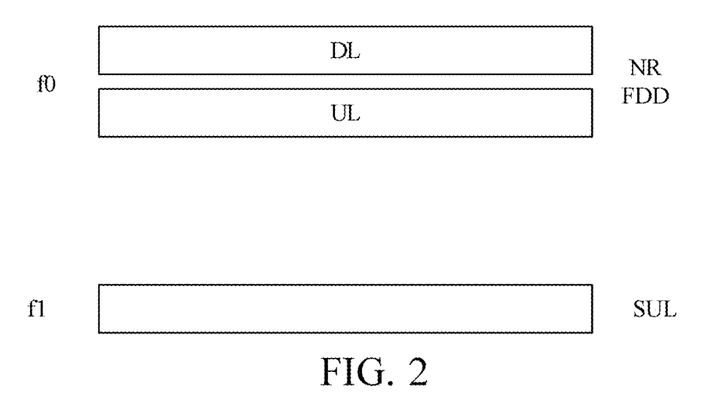
FIG. 2 is a schematic diagram of an uplink carrier in terms of resource allocation according to an embodiment of this application.
Figure 3:
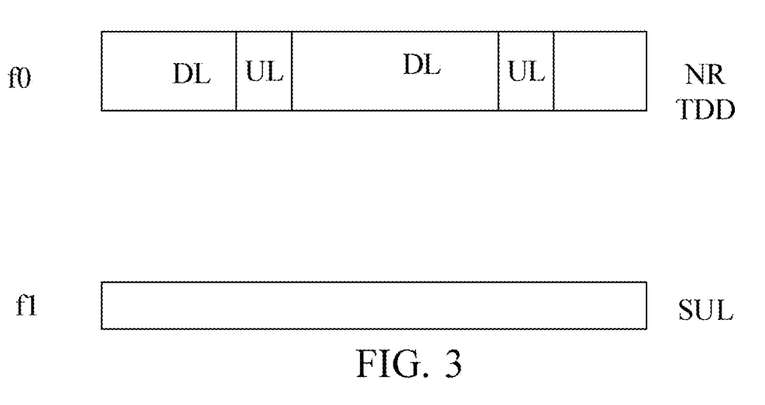
FIG. 3 is a schematic diagram of an uplink carrier in terms of resource allocation according to an embodiment of this application.

For example, as shown in FIG. 2 and FIG. 3, the NR system may include a high frequency UL carrier that belongs to a frequency band f0 and a low frequency UL carrier that belongs to a frequency band f1).

As shown in FIG. 2, frequency division multiplexing (Frequency Division Duplexing, FDD) is performed on the high frequency UL carrier that belongs to the frequency band f0 and a high frequency DL carrier that belongs to the frequency band f0. Alternatively, as shown in FIG. 3, time division multiplexing (Time Division Duplexing, TDD) is performed on the high frequency UL carrier that belongs to the frequency band f0 and a high frequency DL carrier that belongs to the frequency band f0.

Figure 4:
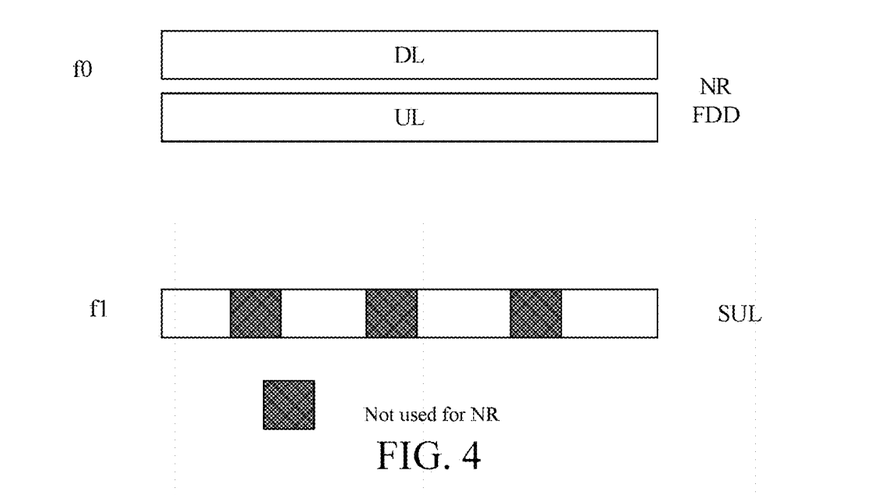
FIG. 4 is a schematic diagram of an uplink carrier in terms of resource allocation according to an embodiment of this application.
Figure 5:
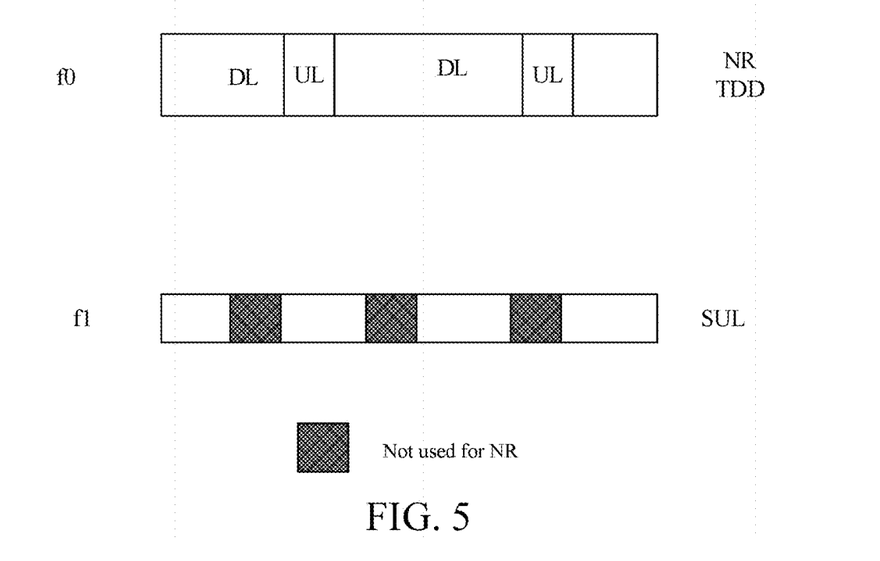
FIG. 5 is a schematic diagram of an uplink carrier in terms of resource allocation according to an embodiment of this application.

Optionally, the SUL may further share a spectrum resource with the LTE system. To be specific, in f1, only some resources may be used for NR, and the other resources are used for LTE. Resources may be shared in a frequency division multiplexing (Frequency Division Multiplexing, FDM) or a time division multiplexing (Time Division Multiplexing, TDM) manner (for example, a TDM manner shown in FIG. 4 and FIG. 5).

It should be understood that although in the foregoing an example in which the NR system has two UL carriers is used for description, this embodiment of this application is not limited thereto. For example, the NR system may alternatively have three or more UL carriers.

It should be further understood that in this embodiment of this application, a plurality of UL carriers included in the NR system may all be used by the terminal device to perform uplink transmission. However, during configuration, it may be only configured that the terminal device uses some UL carriers to perform uplink transmission.

Optionally, a quantity of UL carriers used by the terminal device and a specific UL carrier that are configured by the network device may change dynamically.

In view of this, the embodiments of this application provide a wireless communication method in the following, to resolve wireless communication in a scenario in which a network supports a plurality of UL carriers.

Figure 6:
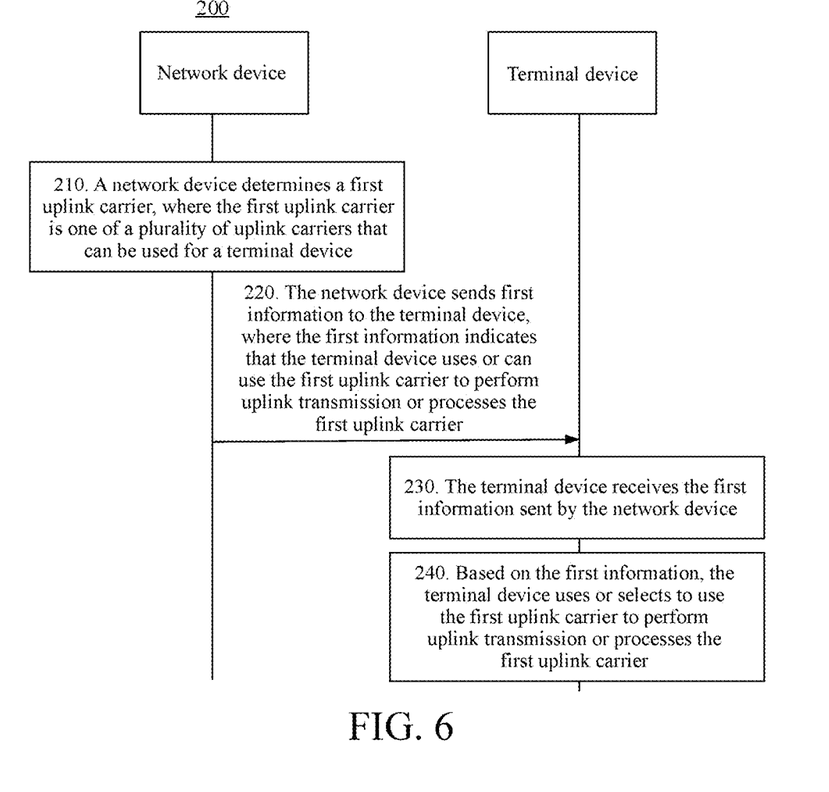
FIG. 6 is a schematic flowchart of a wireless communication method according to an embodiment of this application.

FIG. 6 is a schematic flowchart of a wireless communication method 200 according to an embodiment of this application. The method 200 may be optionally applied to the system shown in FIG. 1, but is not limited thereto. The method 200 includes at least some of the following content.

210. A network device determines a first uplink carrier, where the first uplink carrier is one of a plurality of uplink carriers that can be used for a terminal device.

Optionally, the plurality of uplink carriers that can be used for the terminal device means that the plurality of uplink carriers can be selected or configured for uplink transmission of the terminal device, but this does not represent that the terminal device needs to use the plurality of uplink carriers to perform uplink transmission.

Optionally, the plurality of uplink carriers that can be used for the terminal device respectively belong to a plurality of different frequency bands.

Optionally, any two of the plurality of uplink carriers may partially overlap in frequency domain or do not overlap at all.

Optionally, a frequency band to which the first uplink carrier belongs is lower than frequency bands to which other uplink carriers belong. For example, the first uplink carrier may be the SUL carrier shown in FIG. 2 to FIG. 5.

The uplink carrier in this embodiment of this application may also be referred to as an uplink carrier.

220. The network device sends first information to the terminal device, where the first information indicates that the terminal device uses or can use the first uplink carrier to perform uplink transmission or processes the first uplink carrier.

Optionally, when the first information indicates that the terminal device uses the first uplink carrier to perform uplink transmission, the terminal device may directly use the first uplink carrier in some uplink transmission (transmission of a physical uplink shared channel (Physical Uplink Shared Channel, PUSCH) or a sounding reference signal (Sounding Reference Signal, SRS)).

Optionally, when the first information indicates that the terminal device can use the first uplink carrier to perform uplink transmission, it indicates that the terminal device may select to use the first uplink carrier in some uplink transmission (for example, a random access process), and certainly, may select not to use the first uplink carrier.

Optionally, when the first information indicates that the terminal device processes the first uplink carrier, for example, the terminal device may adjust timing or a transmit power for the first uplink carrier.

Optionally, the network device sends the first information to a plurality of terminal devices by using broadcast signaling, remaining minimum system information (Remaining Minimum System Information, RMSI), or system information.

Optionally, the network device sends the first information to a single terminal device by using high layer signaling.

For example, the network device may send the first information to the single terminal device by using a radio resource control (Radio Resource Control, RRC) command or a Media Access Control (Media Access Control, MAC) control element (Control Element, CE).

230. The terminal device receives the first information sent by the network device.

240. Based on the first information, the terminal device uses or selects to use the first uplink carrier to perform uplink transmission or processes the first uplink carrier.

Specifically, when the first information indicates that the terminal device uses the first uplink carrier to perform uplink transmission, the terminal device uses the first uplink carrier to perform uplink transmission. When the first information indicates that the terminal device can use the first uplink carrier to perform uplink transmission, the terminal device may select to use or not to use the first uplink carrier to perform uplink transmission. When the first information indicates that the terminal device processes the first uplink carrier, the terminal device processes the first uplink carrier.

Therefore, in this embodiment of this application, the plurality of uplink carriers may be used for uplink transmission of the terminal device, and the network device may provide an indication as to use or processing of one of the plurality of uplink carriers, so that uplink transmission of the terminal device can be more flexible, thereby improving communication performance.

Optionally, the first information indicates that the terminal device uses the first uplink carrier to perform uplink transmission. Before sending the first information to the terminal device, the network device sends second information to the terminal device, where the second information is used to activate or configure the first uplink carrier for the terminal device. The first information is optionally carried in downlink control information (Downlink Control Information, DCI).

Optionally, after activating or configuring the first uplink carrier for the terminal device, the network device determines a second uplink carrier in the plurality of uplink carriers that can be used for the terminal device. The network device sends third information to the terminal device, where the third information indicates that the terminal device uses the second uplink carrier to perform uplink transmission, where the first information and the third information are sent respectively in different scheduling processes of performing scheduling for the terminal device after the first uplink carrier is activated or configured. The third information is optionally carried in DCI. The uplink transmission is optionally PUSCH, or the uplink transmission is optionally PUCCH.

That is, the network device may first activate or configure the first uplink carrier. After activating or configuring the first uplink carrier, the network device may dynamically schedule the first uplink carrier, and the terminal device does not need to keep using the first uplink carrier to perform communication. For example, for the terminal device, the network device may alternatively select the second uplink carrier and schedule the second uplink carrier.

Optionally, the first information indicates that the terminal device uses the first uplink carrier to perform uplink transmission. The network device determines a third uplink carrier, where the third uplink carrier is a link carrier other than the first uplink carrier of the plurality of uplink carriers. The network device sends fourth information to the terminal device, where the fourth information indicates that the terminal device uses the third uplink carrier to perform uplink transmission, so that the terminal device stops using the first uplink carrier, and uses the third uplink carrier instead to perform uplink transmission. The first information and the fourth information are optionally information used for semi-static scheduling. The uplink transmission is optionally PUSCH, or the uplink transmission is optionally PUCCH.

Specifically, the network device may provide an indication as to use of an uplink carrier by the terminal device to perform uplink transmission (which may be specific uplink transmission, for example, PUSCH transmission). In this case, after receiving the indication, the terminal device keeps using the uplink carrier to perform uplink transmission (which may be specific uplink transmission, for example, PUSCH transmission), until the terminal device receives indication information for changing the uplink carrier from the network device.

Optionally, the first information is carried in information about a sounding reference signal SRS; and the first information indicates that the terminal device uses the first uplink carrier to transmit the SRS. Therefore, the terminal device may use, based on the first information, the first uplink carrier to transmit the SRS.

In an implementation, the first information is carried in SRS configuration information for semi-statically configuring the SRS.

In another implementation, the first information is carried in a trigger message for dynamically triggering the SRS.

Optionally, the first information is carried in configuration information used for a random access process; and the first information indicates that the terminal device uses or can use the first uplink carrier to perform a random access process. Therefore, the terminal device may perform the random access process on the first uplink carrier, or select to perform or not to perform the random access process on the first uplink carrier.

The configuration information used for a random access process indicates a frequency domain position of a random access resource relative to a reference carrier position.

Optionally, the reference carrier position is a carrier position of the first uplink carrier; or the reference carrier position is a carrier position of an uplink carrier other than the first uplink carrier of the plurality of uplink carriers; or the reference carrier position is a carrier position of a downlink carrier of the terminal device.

Optionally, configuration signaling to which the configuration information belongs is further used to indicate a random access resource and/or a random access code for a random access process on at least one second uplink carrier. A random access resource and/or random access code for the random access process on the first uplink carrier may be the same as the random access resource and/or random access code for the random access process on the second uplink carrier. The random access code in this embodiment of this application may be referred to as a random access preamble (Preamble).

That is, the network device may send random access resources and/or access codes for a random access process that are configured for the plurality of uplink carriers, so that the network device may select an uplink carrier for random access, and use the random access resource and/or access code corresponding to the selected uplink carrier to perform random access.

Optionally, the terminal device may select an uplink carrier for random access based on a specific parameter.

For example, the specific parameter may be used for the terminal device to acquire a DL signal threshold corresponding to an uplink carrier, so that the terminal device selects a corresponding uplink carrier for a random access process based on a relationship between a downlink carrier (Downlink, DL) signal measurement result and the DL signal threshold.

For example, a value corresponding to the DL signal threshold includes a. When a value of a DL signal is greater than or equal to a, the first uplink carrier is selected to perform random access, and when the value of the DL signal is less than a, the second uplink carrier is selected to perform random access.

Optionally, the parameter used to select an uplink carrier during random access may be sent by the network device to the terminal device by using the indication information. The parameter may directly indicate the foregoing DL signal threshold, or a parameter used to indirectly obtain the DL signal threshold may be provided.

The indication information is carried in the foregoing configuration signaling to which the configuration information belongs; or the indication information is sent independently from the foregoing configuration information by using broadcast signaling, RMSI, or system information.

Optionally, the parameter used to select an uplink carrier during random access may be preset on the terminal device.

Optionally, the random access process described in this embodiment of this application is a contention-free (contention-free) random access process.

Optionally, the first information is carried in a command used for adjusting timing (Timing Advance Command) or is carried in transmission of a command used for adjusting timing, and the first information is used to indicate adjustment of timing for the first uplink carrier.

Specifically, when the network device sends the command used for adjusting timing, the command may carry information about an uplink carrier for which timing needs to be adjusted.

In an implementation, the first information is carried in a field included in the command used for adjusting timing.

In an implementation, the first information is indicated by processing information of a physical layer channel used to carry the command used for adjusting timing. For example, the first information is indicated by a scramble code used in transmission in a physical layer.

Optionally, the first information is carried in power adjustment information for the terminal device or is carried in transmission of power adjustment information, and the first information is used to indicate power adjustment for the first uplink carrier.

Specifically, when the network device sends the power adjustment information, the power adjustment information may carry information about an uplink carrier for which the terminal device needs to adjust power.

Figure 7:
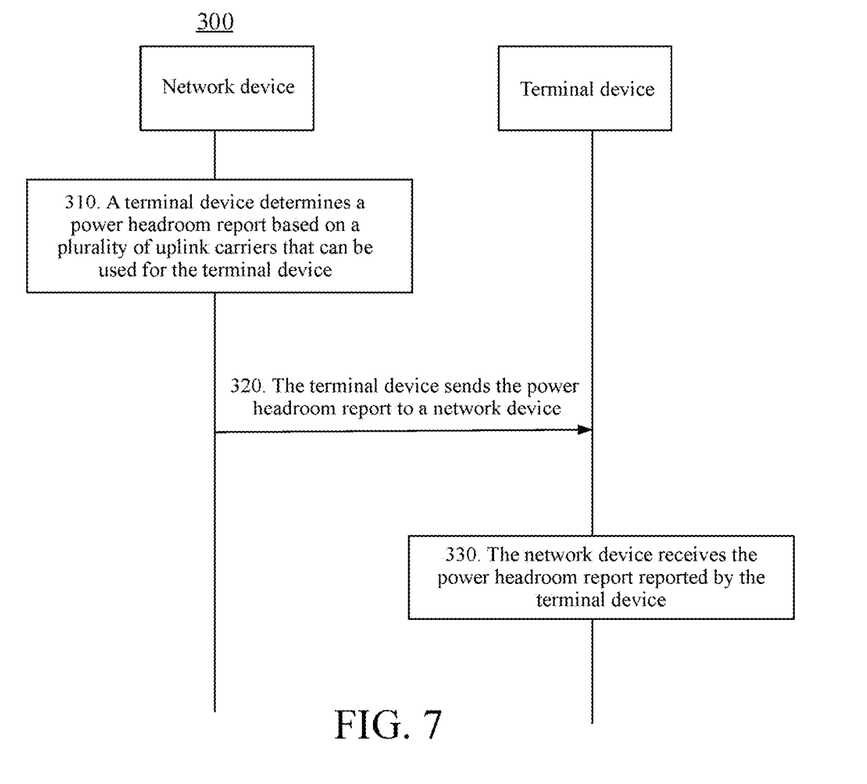
FIG. 7 is a schematic flowchart of a wireless communication method according to an embodiment of this application.

FIG. 7 is a schematic flowchart of a wireless communication method 300 according to an embodiment of this application. The method 300 includes at least some of the following content.

310. A terminal device determines a power headroom report based on a plurality of uplink carriers that can be used for the terminal device.

Optionally, the plurality of uplink carriers that can be used for the terminal device means that the plurality of uplink carriers can be selected or configured for uplink transmission of the terminal device, but this does not represent that the terminal device needs to use the plurality of uplink carriers to perform uplink transmission.

Optionally, the plurality of uplink carriers that can be used for the terminal device respectively belong to a plurality of different frequency bands.

Optionally, any two of the plurality of uplink carriers may partially overlap in frequency domain or do not overlap at all.

The uplink carrier in this embodiment of this application may also be referred to as an uplink carrier.

320. The terminal device sends the power headroom report (Power Headroom Report, PHR) to a network device.

Optionally, the power headroom report includes a power headroom report independently reported by the terminal device for each of the plurality of uplink carriers.

In this case, the terminal device may use each uplink carrier to report the respective power headroom report for the uplink carrier.

In this case, the terminal device may use each uplink carrier to report the respective power headroom report for the uplink carrier, or may use an uplink carrier to report power headroom reports for other uplink carriers.

Optionally, the power headroom report includes a power headroom report reported by the terminal device by using the plurality of uplink carriers as a whole.

In this case, the terminal device may use uplink carriers to report the power headroom reports respectively, or, may use some uplink carriers to report the power headroom reports.

330. The network device receives the power headroom report reported by the terminal device. Therefore, the network device may process the power headroom report.

For example, an uplink carrier that is used or can be used by the terminal device is determined, or, a transmit power is adjusted for at least one uplink carrier.

Therefore, in this embodiment of this application, the terminal device determines the power headroom report based on the plurality of uplink carriers that can be used for the terminal device, and sends the power headroom report to the network device, so that the network device may use the power headroom report to schedule, for the terminal device, the plurality of uplink carriers that can be used for the terminal device.

Figure 8:
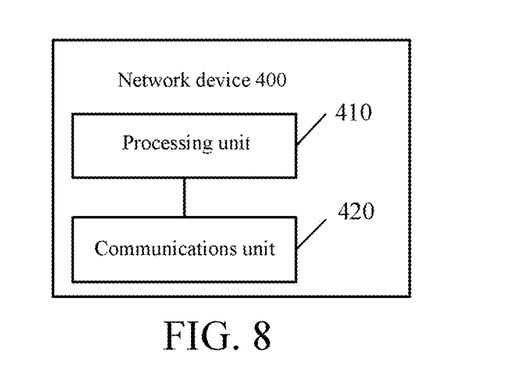
FIG. 8 is a schematic block diagram of a network device according to an embodiment of this application.

FIG. 8 is a schematic block diagram of a network device 400 according to an embodiment of this application. As shown in FIG. 8, the network device 400 includes a processing unit 410 and a communications unit 420.

Optionally, the processing unit 410 is configured to determine a first uplink carrier, where the first uplink carrier is one of a plurality of uplink carriers that can be used for a terminal device; and the communications unit 420 is configured to send first information to the terminal device, where the first information indicates that the terminal device uses or can use the first uplink carrier to perform uplink transmission or processes the first uplink carrier.

Optionally, the communications unit 420 is configured to receive a power headroom report reported by a terminal device for the plurality of uplink carriers that can be used for the terminal device; and the processing unit 410 is configured to process the power headroom report.

It should be understood that the network device 400 may perform corresponding operations performed by the network device in the foregoing method embodiments. For brevity, details are not described herein again.

Figure 9:
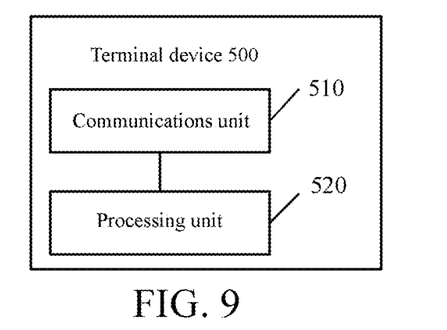
FIG. 9 is a schematic block diagram of a terminal device according to an embodiment of this application.

FIG. 9 is a schematic block diagram of a terminal device 500 according to an embodiment of this application. The terminal device 500 includes a communications unit 510 and a processing unit 520.

Optionally, the communications unit 510 is configured to receive first information sent by a network device, where the first information indicates that the terminal device uses or can use a first uplink carrier to perform uplink transmission or processes a first uplink carrier, and the first uplink carrier is one of a plurality of uplink carriers that can be used for the terminal device; and the processing unit 520 is configured to: based on the first information, use or select to use the first uplink carrier to perform uplink transmission or process the first uplink carrier.

Optionally, the processing unit 520 is configured to determine a power headroom report based on the plurality of uplink carriers that can be used for the terminal device; and the communications unit 510 is configured to send the power headroom report to the network device.

It should be understood that the terminal device 500 may perform corresponding operations performed by the terminal device in the foregoing method embodiments. For brevity, details are not described herein again.

Figure 10:
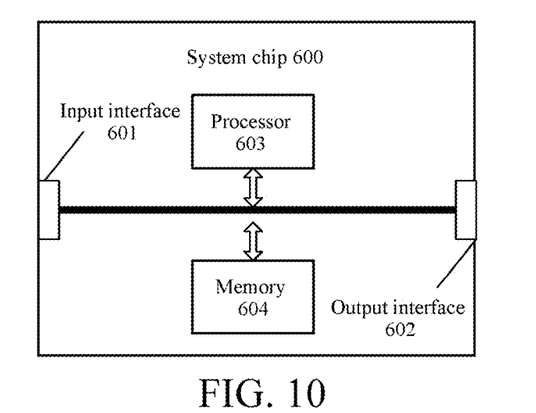
FIG. 10 is a schematic block diagram of a system chip according to an embodiment of this application.

FIG. 10 is a schematic structural diagram of a system chip 600 according to an embodiment of this application. The system chip 600 in FIG. 10 includes an input interface 601, an output interface 602, a processor 603, and a memory 604 that may be connected through an internal communication connection line, where the processor 603 is configured to execute code in the memory 604.

Optionally, when the code is executed, the processor 603 implements the method performed by the network device in the method embodiments. For brevity, details are not described herein again.

Optionally, when the code is executed, the processor 603 implements the method performed by the terminal device in the method embodiments. For brevity, details are not described herein again.

Figure 11:
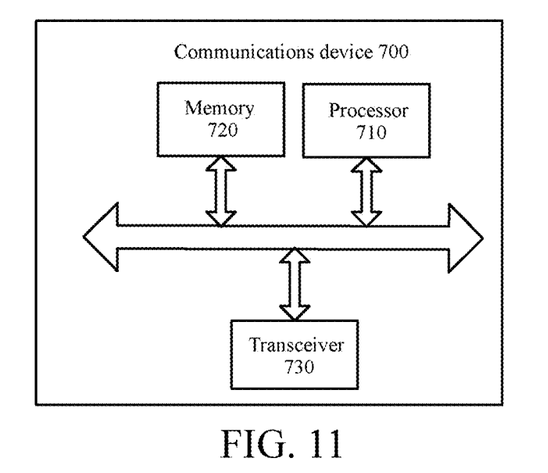
FIG. 11 is a schematic block diagram of a communications device according to an embodiment of this application.

FIG. 11 is a schematic block diagram of a communications device 700 according to an embodiment of this application. As shown in FIG. 11, the communications device 700 includes a processor 710 and a memory 720. The memory 720 may store program code, and the processor 710 may execute the program code stored in the memory 720.

Optionally, as shown in FIG. 11, the communications device 700 may include a transceiver 730, and the processor 710 may control the transceiver 730 to communicate externally.

Optionally, the processor 710 may invoke the program code stored in the memory 720 to perform corresponding operations of a network device in the method embodiments. For brevity, details are not described herein again.

Optionally, the processor 710 may invoke the program code stored in the memory 720 to perform corresponding operations of a terminal device in the method embodiments. For brevity, details are not described herein again.

It should be understood that a processor in the embodiments of this application may be an integrated circuit chip and has a signal processing capability. During implementation, the steps in the foregoing method embodiments may be implemented by using an integrated logic circuit of hardware in the processor or an instruction in the form of software. The processor may be a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a discrete gate or a transistor logic device, or a discrete hardware component. The methods, steps, and logic block diagrams disclosed in the embodiments of this application may be implemented or performed. The general-purpose processor may be a microprocessor or the processor may be any conventional processor or the like. The steps in the methods disclosed with reference to the embodiments of this application may be directly performed or completed by a decoding processor embodied as hardware or performed or completed by using a combination of hardware and software modules in a decoding processor. The software module may be located in a mature storage medium in this field, for example, a random-access memory, a flash memory, a read-only memory, a programmable read-only memory or an electrically erasable programmable memory, or a register. The storage medium is located in a memory, and the processor reads information in the memory and completes the steps in the foregoing methods in combination with the hardware thereof.

It may be understood that a memory in the embodiments of this application may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random-access memory (Random-access memory, RAM) and is used as an external cache. For exemplary rather than limitative description, many forms of RAMs can be used, for example, a static random-access memory (Static RAM, SRAM), a dynamic random-access memory (Dynamic RAM. DRAM), a synchronous dynamic random-access memory (Synchronous DRAM, SDRAM), a double data rate synchronous dynamic random-access memory (Double Data Rate SDRAM, DDR SDRAM), an enhanced synchronous dynamic random-access memory (Enhanced SDRAM, ESDRAM), a synchronous link dynamic random-access memory (Synchlink DRAM, SLDRAM), and a direct Rambus random-access memory (Direct Rambus RAM, DR RAM). It should be noted that the memories in the systems and methods described herein are intended to include, but are not limited to, these memories and memories of any other suitable type.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, or the like) to perform all or some of the steps of the method described in the embodiments of this application. The foregoing storage medium includes: any medium that can store program code, such as a USB flash disk, a removable hard disk, a read-only memory (Read-Only Memory, ROM), a random-access memory (Random-access memory, RAM), a magnetic disk, or an optical disk.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method performed at a network device having one or more processors and memory storing a plurality of programs to be executed by the one or more processors, the method comprising:
    determining, by the network device, a first uplink carrier, wherein the first uplink carrier is one of a plurality of uplink carriers that can be used for a terminal device; and
    sending, by the network device, first information to the terminal device, wherein the first information indicates that the terminal device uses or can use the first uplink carrier to perform uplink transmission or processes the first uplink carrier,
    wherein the first information is carried in downlink control information (DCI), and
    wherein the method further comprises:
    sending, by the network device, second information to the terminal device, wherein the second information is used to activate or configure the first uplink carrier for the terminal device;
    determining, by the network device, a second uplink carrier in the plurality of uplink carriers that can be used for the terminal device; and
    sending, by the network device, third information to the terminal device, wherein the third information indicates that the terminal device uses the second uplink carrier to perform uplink transmission, wherein the first information and the third information are sent respectively in different scheduling processes of performing scheduling for the terminal device after the first uplink carrier is activated or configured by the second information.

2. The method according to claim 1, wherein the uplink transmission is PUCCH transmission or PUSCH transmission.

3. The method according to claim 1, wherein the first information is carried in information related to a sounding reference signal (SRS); and the first information indicates that the terminal device uses the first uplink carrier to transmit the SRS.

4. The method according to claim 3, wherein the first information is carried in SRS configuration information for semi-statically configuring the SRS; or the first information is carried in a trigger message for dynamically triggering the SRS.

5. The method according to claim 1, wherein the first information is carried in power adjustment information used for the terminal device or is carried in transmission of power adjustment information, and the first information is used to indicate power adjustment for the first uplink carrier.

6. The method according to claim 1, wherein the plurality of uplink carriers that can be used for the terminal device respectively belong to a plurality of different frequency bands.

7. The method according to claim 6, wherein a frequency band to which the first uplink carrier belongs is lower than frequency bands to which other uplink carriers belong.

8. A wireless communication method performed at a terminal device having one or more processors and memory storing a plurality of programs to be executed by the one or more processors, the method comprising:

receiving, by the terminal device, first information sent by a network device, wherein the first information indicates that the terminal device uses or can use a first uplink carrier to perform uplink transmission or processes a first uplink carrier, and the first uplink carrier is one of a plurality of uplink carriers that can be used for the terminal device; and based on the first information, using or selecting to use the first uplink carrier to perform uplink transmission or processing the first uplink carrier, wherein the first information is carried in downlink control information (DCI), and wherein the method further comprises:

sending, by the network device, second information to the terminal device, wherein the second information is used to activate or configure the first uplink carrier for the terminal device;

receiving, by the terminal device, third information sent by the network device, wherein the third information indicates that the terminal device uses a second uplink carrier to perform uplink transmission, and the second uplink carrier is a link carrier other than the first uplink carrier of the plurality of uplink carriers; and using, by the network device based on the third information, the second uplink carrier to perform uplink transmission, wherein the first information and the third information are transmitted respectively in different scheduling processes of performing scheduling for the terminal device after the first uplink carrier is activated or configured by the second information.

9. The method according to claim 8, wherein the first information indicates that the terminal device uses the first uplink carrier to perform uplink transmission; and the method further comprises:

receiving, by the terminal device, second information sent by the network device, wherein the second information is used to activate or configure the first uplink carrier for the terminal device; and activating or configuring, by the terminal device, the first uplink carrier.

10. The method according to claim 9, wherein the uplink transmission is PUCCH transmission or PUSCH transmission.

11. The method according to claim 8, wherein the first information is carried in information related to a sounding reference signal (SRS); and the first information indicates that the terminal device uses the first uplink carrier to transmit the SRS.

12. The method according to claim 11, wherein the first information is carried in SRS configuration information for semi-statically configuring the SRS; or the first information is carried in a trigger message for dynamically triggering the SRS.

13. The method according to claim 8, wherein the plurality of uplink carriers that can be used for the terminal device respectively belong to a plurality of different frequency bands.

14. The method according to claim 13, wherein a frequency band to which the first uplink carrier belongs is lower than frequency bands to which other uplink carriers belong.

15. The method according to claim 8, wherein the first information is carried in power adjustment information used for the terminal device or is carried in transmission of power adjustment information, and the first information is used to indicate power adjustment for the first uplink carrier.

16. A network device, comprising a processor, memory, and a transceiver, wherein the processor, the memory, and the transceiver communicate with each other through internal connection channels to enable the network device to:

determine a first uplink carrier, wherein the first uplink carrier is one of a plurality of uplink carriers that can be used for a terminal device; and send first information to the terminal device, wherein the first information indicates that the terminal device uses or can use the first uplink carrier to perform uplink transmission or processes the first uplink carrier, wherein the first information is carried in downlink control information (DCI), and wherein the method further comprises:

sending, by the network device, second information to the terminal device, wherein the second information is used to activate or configure the first uplink carrier for the terminal device;

determining, by the network device, a second uplink carrier in the plurality of uplink carriers that can be used for the terminal device; and sending, by the network device, third information to the terminal device, wherein the third information indicates that the terminal device uses the second uplink carrier to perform uplink transmission, wherein the first information and the third information are sent respectively in different scheduling processes of performing scheduling for the terminal device after the first uplink carrier is activated or configured by the second information.

17. The network device according to claim 16, wherein the first information indicates that the terminal device uses the first uplink carrier to perform uplink transmission; and
the network device is further enabled to:
send second information to the terminal device, wherein the second information is used to activate or configure the first uplink carrier for the terminal device.

18. The network device according to claim 17, wherein the uplink transmission is PUCCH transmission or PUSCH transmission.

19. The network device according to claim 16, wherein the first information is carried in information about a sounding reference signal SRS; and
the first information indicates that the terminal device uses the first uplink carrier to transmit the SRS.

20. The network device according to claim 19, wherein the first information is carried in SRS configuration information for semi-statically configuring the SRS; or
the first information is carried in a trigger message for dynamically triggering the SRS.

21. The network device according to claim 16, wherein the first information is carried in power adjustment information used for the terminal device or is carried in transmission of power adjustment information, and the first information is used to indicate power adjustment for the first uplink carrier.

22. The network device according to claim 16, wherein the plurality of uplink carriers that can be used for the terminal device respectively belong to a plurality of different frequency bands.

23. The network device according to claim 22, wherein a frequency band to which the first uplink carrier belongs is lower than frequency bands to which other uplink carriers belong.

24. A terminal device, comprising a processor, a memory, and a transceiver, wherein the processor, the memory, and the transceiver communicate with each other through internal connection channels to enable the terminal device to:
receive first information sent by a network device, wherein the first information indicates that the terminal device uses or can use a first uplink carrier to perform uplink transmission or processes a first uplink carrier, and the first uplink carrier is one of a plurality of uplink carriers that can be used for the terminal device; and
based on the first information, use or select to use the first uplink carrier to perform uplink transmission or process the first uplink carrier,
wherein the first information is carried in downlink control information (DCI), and
wherein the terminal device is further enabled to:
receive second information sent by the network device and activate or configure the first uplink carrier using the second information;
receive third information sent by the network device, wherein the third information indicates that the terminal device uses a second uplink carrier to perform uplink transmission, and the second uplink carrier is a link carrier other than the first uplink carrier of the plurality of uplink carriers; and
use, based on the third information, the second uplink carrier to perform uplink transmission,
wherein the first information and the third information are transmitted respectively in different scheduling processes of performing scheduling for the terminal device after the first uplink carrier is activated or configured by the second information.

25. The terminal device according to claim 24, wherein the uplink transmission is PUCCH transmission or PUSCH transmission.

26. The terminal device according to claim 24, wherein the first information is carried in information related to a sounding reference signal (SRS); and
the first information indicates that the terminal device uses the first uplink carrier to transmit the SRS.

27. The terminal device according to claim 26, wherein the first information is carried in SRS configuration information for semi-statically configuring the SRS; or
the first information is carried in a trigger message for dynamically triggering the SRS.

28. The terminal device according to claim 24, wherein the plurality of uplink carriers that can be used for the terminal device respectively belong to a plurality of different frequency bands.

29. The terminal device according to claim 28, wherein a frequency band to which the first uplink carrier belongs is lower than frequency bands to which other uplink carriers belong.

30. The terminal device according to claim 24, wherein the first information is carried in power adjustment information used for the terminal device or is carried in transmission of power adjustment information, and the first information is used to indicate power adjustment for the first uplink carrier.

* * * * *

UNITED STATES PATENT AND TRADEMARK OFFICE
CERTIFICATE OF CORRECTION

PATENT NO. : 11,310,814 B2
APPLICATION NO. : 16/812134
DATED : April 19, 2022
INVENTOR(S) : Chen et al.

It is certified that error appears in the above-identified patent and that said Letters Patent is hereby corrected as shown below:

In the Claims

Claim 8, Column 19, Line 50, delete "sending, by" and insert --receiving, from--.

Claim 8, Column 19, Line 50, delete "to" and insert --at--.

Claim 8, Column 19, Line 60, delete "network" and insert --terminal--.

Signed and Sealed this
Eighth Day of October, 2024

*Katherine Kelly Vidal*

Katherine Kelly Vidal
*Director of the United States Patent and Trademark Office*